United States Patent
Goel et al.

(10) Patent No.: US 12,486,993 B2
(45) Date of Patent: Dec. 2, 2025

(54) HVAC SYSTEM WITH LEAK DETECTION AND METHOD OF USE

(71) Applicant: Lennox Industries Inc., Richardson, TX (US)

(72) Inventors: Rakesh Goel, Irving, TX (US); Siddarth Rajan, Addison, TX (US)

(73) Assignee: Lennox Industries Inc., Richardson, TX (US)

( * ) Notice: Subject to any disclaimer, the term of this patent is extended or adjusted under 35 U.S.C. 154(b) by 164 days.

(21) Appl. No.: 18/532,471

(22) Filed: Dec. 7, 2023

(65) Prior Publication Data
US 2025/0189152 A1    Jun. 12, 2025

(51) Int. Cl.
  *F24F 11/36*  (2018.01)
  *F24F 11/52*  (2018.01)

(52) U.S. Cl.
  CPC ............. *F24F 11/36* (2018.01); *F24F 11/52* (2018.01)

(58) Field of Classification Search
  CPC ...... F24F 11/36; F24F 11/52; F25B 2500/222
  See application file for complete search history.

(56) References Cited

U.S. PATENT DOCUMENTS

| | | | |
|---|---|---|---|
| 2019/0170600 A1* | 6/2019 | Tice | G01M 3/2815 |
| 2021/0108857 A1* | 4/2021 | Thobias | F28D 1/0477 |
| 2023/0349576 A1* | 11/2023 | Zhang | F24F 11/64 |

* cited by examiner

*Primary Examiner* — Jonathan Bradford
(74) *Attorney, Agent, or Firm* — Baker Botts L.L.P.

(57) ABSTRACT

A method of operating an HVAC system includes receiving a first loss of charge parameter of refrigerant from a loss of charge sensor. The method includes determining that refrigerant leak diagnostics should be performed for the HVAC system based on a comparison of the first loss of charge parameter to a loss of charge threshold. The method includes turning off a compressor in a control panel unit and a blower in an indoor unit for a predetermined wait time. The method includes receiving a measurement after the predetermined wait time that is indicative of a concentration of the refrigerant in the indoor unit from a first leak detection sensor, and receiving a measurement that is indicative of a concentration of the refrigerant in the control panel unit from a second leak detection sensor. The method includes determining a leak location of the refrigerant using a controller.

20 Claims, 5 Drawing Sheets

HVAC SYSTEM WITH LEAK DETECTION AND METHOD OF USE

TECHNICAL FIELD

This disclosure relates generally to heating, ventilation, and air conditioning (HVAC) systems. More particularly, this disclosure relates to an HVAC system with leak detection and method of use.

BACKGROUND

Heating, ventilation, and air conditioning (HVAC) systems are used to regulate environmental conditions within an enclosed space. Air is cooled via heat transfer with refrigerant flowing through the HVAC system and returned to the enclosed space as conditioned air.

SUMMARY

Regulations in the HVAC industry are pushing manufacturers to transition away from traditional refrigerants towards low global warming potential (GWP) refrigerants, particularly mildly flammable (A2L) refrigerants. To accommodate for the changes, manufacturers may need to design HVAC systems to be optimized specific to the A2L refrigerants (e.g., R-32 and/or R-454B). Particularly, the HVAC systems may need a sensor to sense the mildly flammable A2L refrigerant in the event of a leak. The provided systems and methods are integrated into the practical application of using a combination of leak detection sensors and one or more loss of charge sensor to identify a location of a leak within the HVAC system. The provided systems and methods provide several practical applications and technical advantages. For example, the provided system and methods provide an improvement to the underlying technology via the leak detection sensors and the one or more loss of charge sensor which provides an alert that identifies the location of a leak in the HVAC system. Refrigerant leaks reduce the efficiency of the HVAC system and increase energy requirements to operate the system. Providing the user with an indication of a refrigerant leak and providing a technician with the location of the leak improves the underlying technology by mitigating refrigerant leaks within HVAC system and increasing the speed at which the leak can be addressed the technician.

In some embodiments, a heating, ventilation and air conditioning (HVAC) system is provided. The HVAC system comprises an outdoor unit that comprises a condenser configured to receive refrigerant. The HVAC system comprises an indoor unit that comprises an expansion valve configured to receive the refrigerant from the condenser, an evaporator configured to receive the refrigerant from the expansion valve, a blower configured to move airflow across the evaporator, and a first leak detection sense. The HVAC system comprises at least one loss of charge sensor configured to measure at least one loss of charge parameter of the refrigerant flowing through the HVAC system. The HVAC system comprises a control panel unit that comprises a compressor configured to receive the refrigerant from the evaporator, a second leak detection sensor, and a controller. The controller comprises a memory and a processor, where the memory is operable to store at least a first loss of charge threshold, a first predetermined wait time, and a gas concentration threshold. The processor is operatively coupled to the memory and configured to receive, from the at least one loss of charge sensor, at least a first loss of charge parameter. The processor is further configured to determine that refrigerant leak diagnostics should be performed for the HVAC system based on a comparison of at least the first loss of charge parameter to the at least one loss of charge threshold. The processor is configured to turn the compressor and the blower off for the first predetermined wait time in response to the comparison of the first loss of charge parameter to the at least one loss of charge threshold. The processor is further configured to receive, from the first leak detection sensor after the first predetermined wait time, a measurement that is indicative of a concentration of the refrigerant in the indoor unit, and receive, from the second leak detection sensor, a measurement that is indicative of a concentration of the refrigerant in the control panel unit. The processor is further configured to determine a leak location of the refrigerant, where (i) if the concentration of the refrigerant in the indoor unit and the control panel is less than the gas concentration threshold, the processor is configure to determine that the leak location of the refrigerant is in the outdoor unit of the HVAC system; (ii) if the concentration of the refrigerant in the indoor unit is greater than the gas concentration threshold, the processor is configured to determine that the leak location is in the indoor unit of the HVAC system; (iii) if the concentration of the refrigerant in the control panel unit is greater than the gas concentration threshold, the processor is configured to determine that the leak location is in the control panel unit of the HVAC system.

Certain embodiments of the present disclosure may include some, or none of these advantages. These advantages and other features will be more clearly understood from the following detailed description taken in conjunction with the accompanying drawings and claims.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 6 of the drawings, like numerals being used for like and corresponding parts of the various drawings.

Regulations in the HVAC industry are pushing manufacturers to transition away from traditional refrigerants towards low global warming potential (GWP) refrigerants, particularly mildly flammable (A2L) refrigerants. To accommodate for the changes, manufacturers may need to design HVAC systems to be optimized specific to the A2L refrigerants (e.g., R-32 and/or R-454B). Particularly, the HVAC systems may need a sensor to sense the mildly flammable A2L refrigerant in the event of a leak. The provided systems and methods are integrated into the practical application of using a combination of leak detection sensors and one or more loss of charge sensor to identify a location of a leak within the HVAC system.

HVAC System

Figure 1:
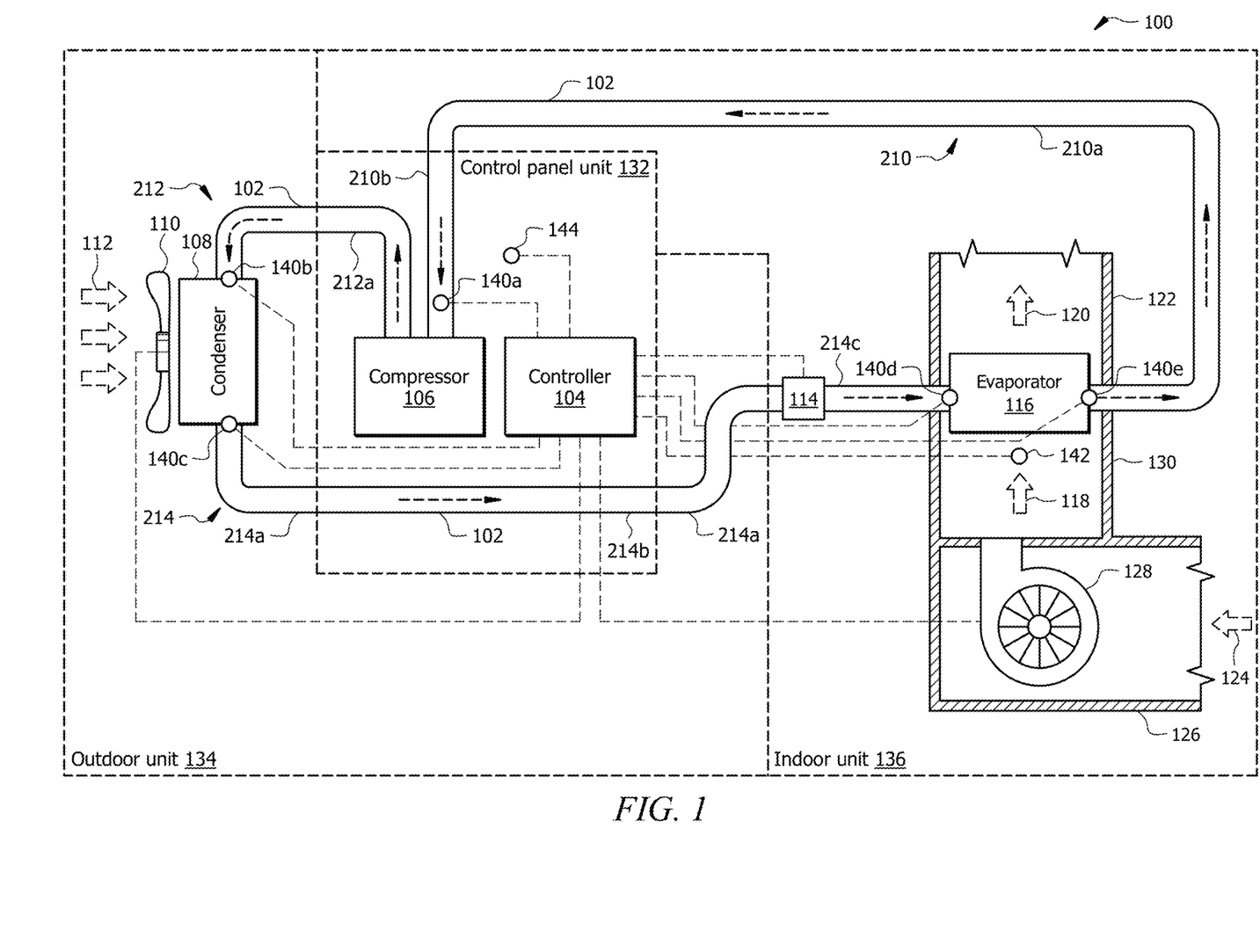
FIG. 1 is a diagram of an HVAC system according to some embodiments of the present disclosure.

FIGS. 1-5 show an example HVAC system 100 according to an embodiment of the present disclosure. The HVAC system 100 conditions air for delivery to a conditioned space (e.g., all or a portion of a room, a house, an office building, a warehouse, or the like). In some embodiments, the HVAC system 100 is a rooftop unit (RTU) that is positioned on the roof of a building, and the conditioned air is delivered into the interior of the building. In other embodiments, portion(s) of the HVAC system 100 may be located within the building and portion(s) outside the building. The HVAC system 100 may be configured as shown in FIG. 1 or in any other suitable configuration. For example, the HVAC system 100 may include additional components or may omit one or more components shown in FIGS. 1-2.

Figure 2:
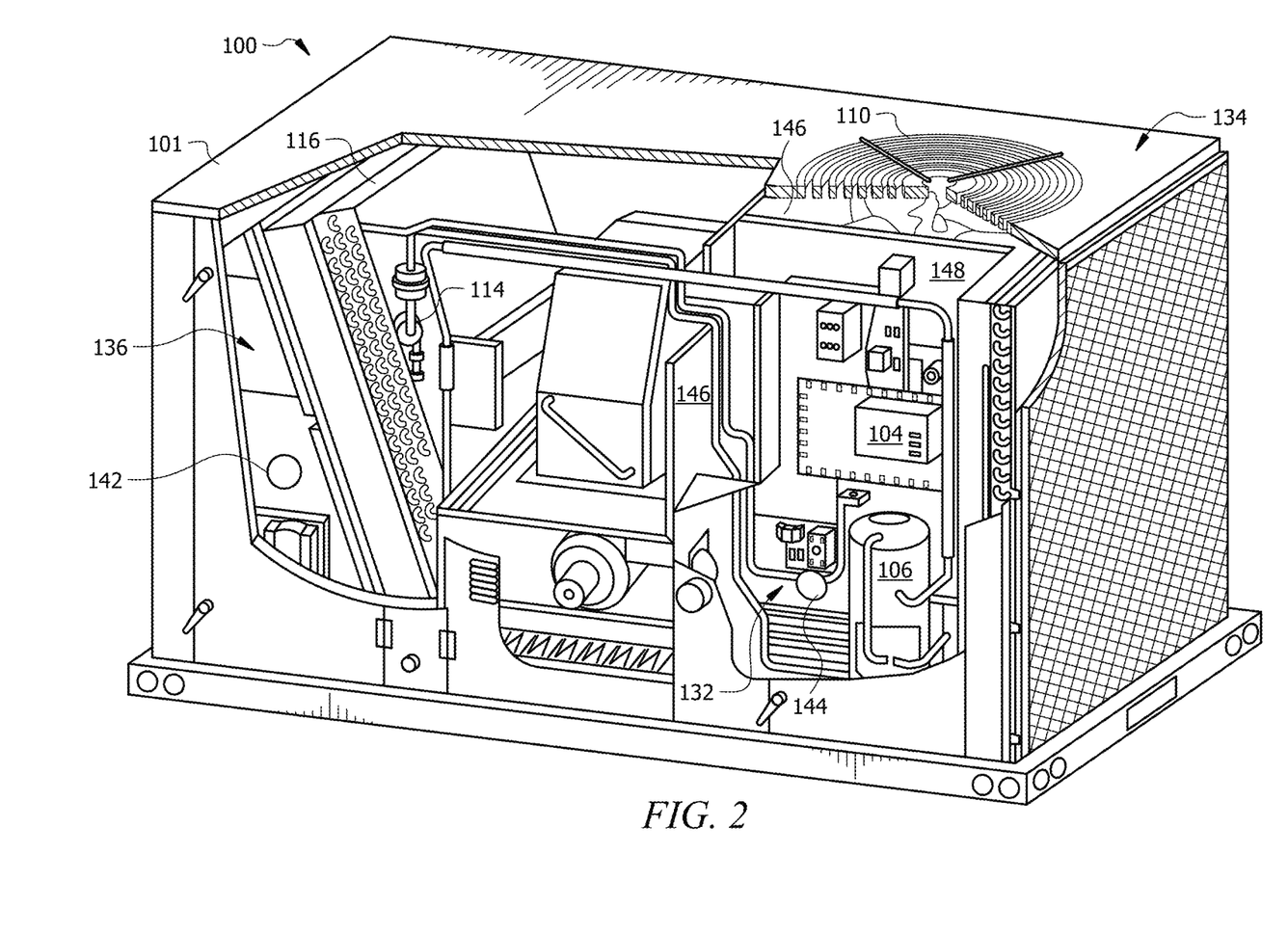
FIG. 2 is diagram of the HVAC system of FIG. 1 according to some embodiments of the present disclosure.

In general, the HVAC system 100 includes a working fluid conduit 102, a controller 104, a compressor 106, a condenser 108, a fan 110, an expansion valve 114, an evaporator 116, a blower 128, one or more loss of charge sensor 140a-140e (e.g., a suction pressure sensor 140a, a first condenser sensor 140b, a second condenser sensor 140c, a first evaporator sensor 140d, a second evaporator sensor 140e), a first leak detection sensor 142, and a second leak detection sensor 144. The HVAC system 100 includes a control panel unit 132 that includes the controller 104, the compressor 106, the first loss of charge sensor (e.g., the suction pressure sensor 140a), and the second leak detection sensor 144. The HVAC system 100 includes an outdoor unit 134 that includes the condenser 108, the fan 110, a second loss of charge sensor (e.g., the first condenser sensor 140b), and a third loss of charge sensor (e.g., the second condenser sensor 140c). The HVAC system 100 includes an indoor unit 136 that includes the expansion valve 114, the evaporator 116, the blower 128, a fourth loss of charge sensor (e.g., the first evaporator sensor 140d), a fifth loss of charge sensor (e.g., the second evaporator sensor 140e), and a first leak detection sensor 142.

As will be described in greater detail below, the controller 104 is generally configured to determine that refrigerant leak diagnostics 202 should be performed. The refrigerant leak diagnostics 202 may determine a leak location 204 for the refrigerant leak. For example, the controller 104 may receive one or more loss of charge parameters 166 from the one or more loss of charge sensors 140a-140e. The controller 104 may determine that refrigerant leak diagnostics 202 should be performed based on a comparison of one or more of the loss of charge parameters 166 to one or more loss of charge thresholds 168 (e.g., a suction pressure 194 is less than a suction pressure threshold 196, a superheat value 190 is greater than a superheat threshold 198, and/or a subcooled value 192 is less than a subcooled value threshold 200). The controller 104 may turn off the compressor 106 and the blower 128 for a predetermined wait time 170 in response to the comparison of the one or more loss of charge parameters 166 to the one or more loss of charge thresholds 168. The controller 104 may receive a measurement that is indicative of a first concentration 174a of the refrigerant in the indoor unit 136 from the first leak detection sensor 142 after the predetermined wait time 170. The controller 104 may also receive a measurement that is indicative of a second concentration 174b of the refrigerant in the control panel unit 132 from the second leak detection sensor 144. The controller 104 may determine the leak location 204 of the refrigerant. For example, if the first concentration 174a of the refrigerant in the indoor unit 136 and the second concentration 174b of the refrigerant in the control panel unit 132 is less than a gas concentration threshold 172 (e.g., less than 12% of a lower flammability limit of the refrigerant), then the controller 104 may determine that the leak location 204 is in the outdoor unit 134. If the first concentration 174a of the refrigerant in the indoor unit 136 is greater than the gas concentration threshold 172, the controller 104 may determine that the leak location 204 is in the indoor unit 136. If the second concentration 174b of the refrigerant in the control panel unit 132 is greater than the gas concentration threshold 172, the controller 104 may determine that the leak location 204 is in the control panel unit 132 of the HVAC system 100.

In some embodiments, the working fluid conduit 102 facilitates the movement of a working fluid (e.g., one or more refrigerants) through a cooling cycle such that the working fluid flows as illustrated by the dashed arrows in FIG. 1. The working fluid may be any acceptable working fluid including, but not limited to, fluorocarbons (e.g., chlorofluorocarbons), ammonia, non-halogenated hydrocarbons (e.g., propane), or hydrofluorocarbons (e.g., R-410A). In some embodiments, the working fluid comprises a mildly flammable A2L refrigerant. As used herein, the term "mildly flammable A2L refrigerant" may be defined in one embodiment according to ASHRAE Standard 34. In one example, according to the ASHRAE Standard 34, the mildly flammable A2L refrigerant meets all four of the following conditions: (i) exhibits flame propagation when tested at 140° F. (60° C.) and 14.7 psia (101.3 kPa); (ii) has a lower flammability limit (LFL)>0.0062 lb/ft$^3$ (0.10 kg/m$^3$); (iii) has a heat of combustion <8169 Btu/lb (19,000 KJ/kg); and (iv) has a maximum burning velocity of ≤3.9 in/s (10 cm/s) when tested at 73.4° F. (23° C.) and 14.7 psia (101.3 kPa) in dry air. Suitable examples of mildly flammable A2L refrigerants include, but are not limited to, R-32, R-454b, or combinations thereof.

In some embodiments, the working fluid conduit 102 includes a suction line 210 that places the evaporator 116 in fluid communication with the compressor 106, a discharge line 212 that places the compressor 106 in fluid communication with the condenser 108, and a liquid line 214 that places the condenser in fluid communication with the evaporator 116. In some embodiments, the indoor unit 136 includes a first portion 210a of the suction line 210 and the control panel unit 132 includes a second portion 210b of the suction line 210. In some embodiments, the control panel unit 132 includes a first portion 212a of the discharge line 212 and the outdoor unit includes a second portion 212b of the discharge line 212. In some embodiments, the outdoor unit 134 includes a first portion 214a of the liquid line 214, the control panel unit 132 includes a second portion 214b of the liquid line 214, and the indoor unit 136 includes a third portion 214c of the liquid line 214.

The compressor 106 is coupled to the working fluid conduit 102 and compresses (i.e., increases the pressure) of the working fluid. The compressor 106 is in signal communication with the controller 104 using wired and/or wireless connection. The controller 104 provides commands and/or signals to control operation of the compressor 106 and/or receive signals form the compressor 106 corresponding to a status of the compressor 106. The compressor 106 may be a single-speed, variable-speed, or multiple stage compressor. A variable-speed compressor is generally configured to operate at different speeds to increase the pressure of the working fluid to keep the working fluid moving along the working fluid conduit 102. In the variable-speed compressor configuration, the speed of compressor 106 can be modified to adjust the cooling capacity of the HVAC system 100. Meanwhile, in the multi-stage compressor configuration, one or more compressors can be turned on or off to adjust the cooling capacity of the HVAC system 100.

The condenser 108 is configured to facilitate movement of the working fluid through the working fluid conduit 102. The condenser 108 is generally located downstream of the compressor 106 and is configured to remove heat from the working fluid. The condenser 108 is generally any heat exchanger configured to transfer heat between airflow 112 flowing across the condenser 108 and the refrigerant flowing through the condenser 108. The condenser 108 may include one or more circuits of coils. The fan 110 is configured to move airflow 112 across the condenser 108. For example, the fan 110 may be configured to blow outside air through the condenser 108 to help cool the working fluid flowing therethrough. The fan 110 may be in communication with the controller 104 (e.g., via wired and/or wireless communication) to receive control signals for turning the fan 110 on and off and/or adjusting a speed of the fan 110. The compressed, cooled working fluid flows from the condenser 108 toward the expansion valve 114.

The expansion valve 114 is coupled to the working fluid conduit 102 downstream of the condenser 108 and is configured to remove pressure from the working fluid. In this way, the working fluid is delivered to the evaporator 116. In general, the expansion valve 114 may be a valve such as an expansion valve or a flow control valve (e.g., a thermostatic expansion valve (TXV)) or any other suitable valve for removing pressure from the working fluid while, optionally, providing control of the rate of flow of the working fluid. The expansion valve 114 may be in communication with the controller 104 (e.g., via wired and/or wireless communication) to receive control signals for opening and/or closing associated valves and/or to provide flow measurement signals corresponding to the rate of working fluid flow through the working fluid conduit 102.

The evaporator 116 is generally any heat exchanger configured to provide heat transfer between air flowing across the evaporator 116 (i.e., airflow 118 contacting an outer surface of one or more coils of the evaporator 116) and working fluid passing through the interior of the evaporator 116. The evaporator 116 may include one or more circuits of coils. The evaporator 116 is fluidically connected to the compressor 106, such that working fluid generally flows from the evaporator 116 to the compressor 106 when the HVAC system 100 is operating to provide cooling.

A portion of the HVAC system 100 is configured to move airflow 118 provided by the blower 128 across the evaporator 116 and out of a duct system 122 as conditioned airflow 120. Return air 124, which may be air returning from the building, fresh air from outside, or some combination, is pulled into a return duct 126. A suction side of the blower 128 pulls the return air 124. The blower 128 discharges the airflow 118 into a duct 130 such that the airflow 118 crosses the evaporator 116 to produce conditioned airflow 120. The blower 128 is any mechanism for providing the airflow 118 through the HVAC system 100. For example, the blower 128 may be a constant speed or variable speed circulation blower or fan. Examples of a variable speed blower include, but are not limited to, belt-drive blowers controlled by inverters, direct-drive blowers with electronic commuted motors (ECM), or any other suitable type of blower.

FIG. 1 illustrates the HVAC system 100 operating in a cooling mode. In some embodiments, the HVAC system 100 may be operated as a heat pump in a heating mode. Generally, when the HVAC system 100 is operating in the heating mode, the flow of refrigerant is reversed, such that the condenser 108 acts an evaporator and the evaporator 116 acts as a condenser to heat the flow of air passing therethrough. If the HVAC system 100 is configured to operate as a heat pump, the HVAC system 100 may include a reversing valve to reverse the flow of working fluid through the HVAC system 100 during operation in the heating mode and an outdoor expansion device for expanding the working fluid provided to the condenser 108, which acts an evaporator in the heating mode. During the heating mode, the HVAC system 100 may include a heating element to provide supplemental and/or backup heating to the flow of air.

The HVAC system 100 includes at least one loss of charge sensors 140a-140e that are configured to measure one or more loss of charge parameter 166 of the refrigerant flowing through the HVAC system 100. In some embodiments, the one or more loss of charge sensors 140a-140e includes a suction pressure sensor 140a operable to measure one or more suction pressures 194 of the compressor 106. In some embodiments, the suction pressure sensor 140a is positioned proximate to an inlet of the compressor 106. While the suction pressure sensor 140a is illustrated near the inlet of the compressor 106, the suction pressure sensor 140a may be located at any position in the suction line 210. The suction pressure sensor 140a is configured to measure one or more suction pressures 194 of the refrigerant in the suction line 210. As will be detailed below, a loss of suction pressure of the refrigerant during operation may be indicative of a loss of charge of the refrigerant (i.e., a refrigerant leak in the HVAC system 100). For example, the controller 104 may store a suction pressure threshold 196 in a memory 164, and the controller 104 may determine that refrigerant leak diagnostics 202 should be performed when the suction pressure sensor 140a measures a suction pressure 194 that is less than the suction pressure threshold 196. In one non-limiting example, the suction pressure threshold 196 is set to 100 psig. The suction pressure sensor 140a may be in wired and/or wireless signal communication with controller 104 to provide signals corresponding to the one or more suction pressures 194 measured by the suction pressure sensor 140a.

Figure 3:
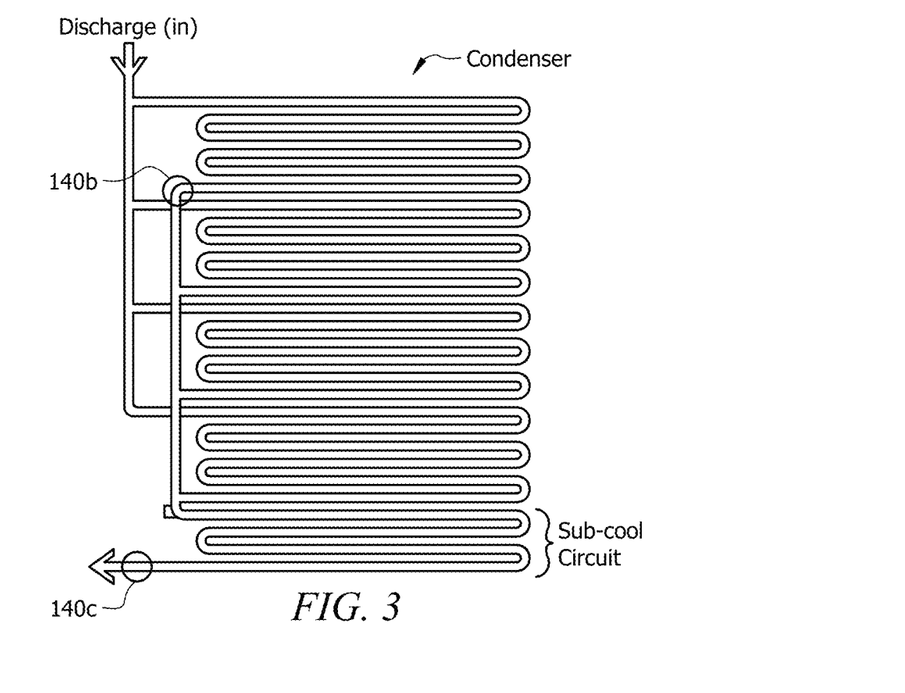
FIG. 3 is a diagram of a condenser of the HVAC system of FIG. 1 according to some embodiments of the present disclosure.

Referring to FIGS. 1 and 3, the one or more loss of charge sensors 140a-140e may include a first condenser sensor 140b and a second condenser sensor 140c. The first condenser sensor 140b may be configured to measure a saturated liquid temperature 182 of the working fluid flowing in the condenser 108, and configured to provide a corresponding saturated liquid temperature signal to the controller 104. As used herein, a "saturated liquid" may refer to a working fluid in the liquid state that is in thermodynamic equilibrium with the vapor state of the fluid for a given pressure. A "saturated liquid" is said to be at the saturation temperature for a given pressure. If the temperature of a saturated liquid is increased above the saturation temperature, the saturated liquid generally begins to vaporize. The first condenser sensor 140b may be a temperature sensor such as a thermocouple or a thermistor. In some embodiments, the first condenser sensor 140b is a pressure sensor (e.g., to measure a saturated liquid temperature 182 indirectly via a measure of saturation pressure).

Similarly, a second condenser sensor 140c may be configured to measure one or more subcooled liquid temperatures 188 of the working fluid in and/or exiting the condenser 108, and configured to provide a corresponding subcooled liquid temperature signal to the controller 104. A "subcooled liquid" may refer to a fluid in the liquid state that is cooled below the saturation temperature of the fluid at a given pressure. The second condenser sensor 140c may be a temperature sensor such as a thermocouple or a thermistor. Referring to FIG. 3 momentarily, the first condenser sensor 140b may be located approximately at the center of the length of a circuit of the condenser 108. This location may correspond to a position where the working fluid flowing through the condenser 108 is a saturated liquid. The second condenser sensor 140c may be located on or near an exit of a subcooled circuit of the condenser 108 on a portion of the liquid line 214 just after the outlet of the condenser 108. The first condenser sensor 140b and the second condenser sensor 140c may be attached on or within the condenser 108 and/or the working fluid conduit 102 using any appropriate means (e.g., clamps, adhesives, or the like).

As will be detailed below, the controller 104 may determine a subcooled value 192 based on a difference between a subcooled liquid temperature 188 measured by the second condenser sensor 140c and a saturated liquid temperature 182 measured by the first condenser sensor 140b. The subcooled value 192 may be indicative of a loss of charge (i.e., a refrigerant leak) in the HVAC system 100. For example, a subcooled value 192 that falls at or below a subcooled value threshold 200 may be indicative of a loss of charge of the refrigerant in the HVAC system 100. The controller 104 may store the subcooled value threshold 200 in the memory 164, and the controller 104 may determine that refrigerant leak diagnostics 202 should be performed when the subcooled value 192 is less than or equal to the subcooled value threshold 200. In one non-limiting example, the subcooled value threshold 200 is set to 4° F.

Figure 4:
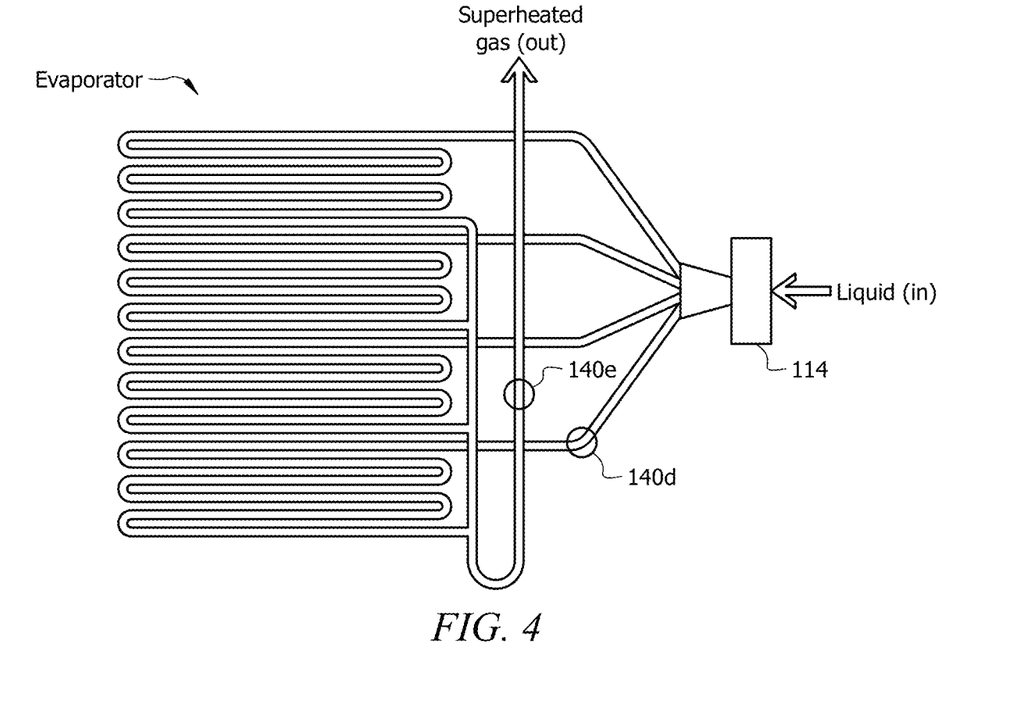
FIG. 4 is a diagram of an evaporator of the HVAC system of FIG. 1 according to some embodiments of the present disclosure.

Referring to FIGS. 1 and 4, the one or more loss of charge sensors 140a-140e may include a first evaporator sensor 140d and a second evaporator sensor 140e. The first evaporator sensor 140d may be configured to measure one or more saturated suction temperatures 184 of the working fluid following in the evaporator 116, and configured to provide a corresponding saturated suction temperature signal to the controller 104. The first evaporator sensor 140d may be a temperature sensor such as a thermocouple or a thermistor. In some embodiments, the first evaporator sensor 140d may be a pressure sensor (e.g., to measure a saturated suction temperature indirectly via a measure of saturation pressure). Similarly, a second evaporator sensor 140e may be configured to measure one or more suction temperatures 186 of the working fluid in and/or exiting the evaporator 116, and configured to provide a corresponding suction temperature signal to the controller 104. The second evaporator sensor 140e may be a temperature sensor such as a thermocouple or a thermistor. Referring to FIG. 4 momentarily, the first evaporator sensor 140d may be located approximately on or near an end of a distributor line (e.g., a line from the outlet of the expansion valve 114 to the inlet of the evaporator 116). This location may correspond to a position where the working fluid flowing through, or into, the evaporator 116 is a saturated vapor. The second evaporator sensor 140e may be located on or near the outlet of the evaporator 116. For instance, the second evaporator sensor 140e may be located in a portion of the evaporator 116 containing a superheated vapor working fluid or in a portion of the suction line 210 leading towards the compressor 106. A "superheated vapor" may refer to a fluid in the vapor state that is heated to a temperature that is greater than the saturation temperature of the fluid at a given pressure. The first evaporator sensor 140d and the second evaporator sensor 140e may be attached on or within the evaporator 116 or working fluid conduit 102 using any appropriate means (clamps, adhesives, or the like).

As will be detailed below, the controller 104 may determine a superheat value 190 based on a difference between the suction temperature 186 measured by the second evaporator sensor 140e and the saturated suction temperature 184 measured by the first evaporator sensor 140d. The superheat value 190 may be indicative of a loss of charge in the HVAC system 100. For example, a superheat value 190 that falls at or above a superheat value threshold 198 may be indicative of a loss of charge of the refrigerant tin the HVAC system 100. The controller 104 may store the superheat value threshold 198 in the memory 164, and the controller 104 may determine that refrigerant leak diagnostics 202 should be performed when the superheat value 190 is greater than or equal to the superheat value threshold 198. In one non-limiting example, the superheat value threshold is set to 25° F.

The HVAC system 100 includes a first leak detection sensor 142 in signal communication with the controller 104 (e.g., via wired and/or wireless connection). The first leak detection sensor 142 is positioned in the indoor unit 136. For example, the first leak detection sensor 142 may be positioned adjacent to the duct system 122, the evaporator 116, the suction line 210, and/or the liquid line 214. Although a single sensor is depicted, it is to be appreciated that multiple sensors could be in the indoor unit 136. The first leak detection sensor 142 is configured to generate a measurement that is indicative of a first concentration 174a of refrigerant that has leaked to the indoor unit 136, and configured to provide a corresponding measurement signal to the controller 104. The HVAC system 100 includes a second leak detection sensor 144 in signal communication with the controller 104 (e.g., via wired and/or wireless connection). The second leak detection sensor 144 is positioned in the control panel unit 132. For example, the second leak detection sensor 144 may be positioned adjacent to the compressor 106, the controller 104, the suction line 210, or the discharge line 212 in the control panel unit 132. Although a single sensor is depicted, it is to be appreciated that multiple sensors could be in the control panel unit 132. The second leak detection sensor 144 is configured to generate a measurement that is indicative of a second concentration 174b of refrigerant that has leaked to the control panel unit 132, and configured to provide a corresponding measurement signal to the controller 104. As shown in FIG. 2, the HVAC system 100 may include a housing 101 that comprises a first partition 146 that separates the first leak detection sensor 142 in the indoor unit 136 from the second leak detection sensor 144 in the control panel unit 132. The first partition 146 may further separate the indoor unit 136 from the outdoor unit 134. The housing 101 may further include a second partition that separates the control panel unit 132 from the outdoor unit 134. Each of the first partition 146 and the second partition 148 may include one or more openings to allow the working fluid conduit 102 to pass therethrough and place the various components of the respective units in fluid communication, as described above.

In some embodiments, the first leak detection sensor 142 and the second leak detection sensor 144 are speed of sound sensors. The speed of sound sensor may include a transmitter configured to emit a sonic signal through the air to a receiver at a known distance. The speed of sound sensor measures a travel time of the sonic signal between the transmitter and the receiver as it travels through the air to determine a speed of sound (e.g., acoustic velocity) of the sonic signal in the air. The speed of sound sensor is configured to detect working fluid that leaks into the air because the working fluid leak will change the density of the air, which will in turn change the travel time of the sonic signal through the air. The speed of sound sensor can measure the change in the speed of sound through the air. The change of the speed of sound is indicative of the gas leak, and the controller 104 may compare the measured value to a calibration curve to generate a concentration 174 of the working fluid that has leaked into either the control panel unit 132 or the indoor unit 136. The calibration curve can be constructed and stored in the controller 104 by measuring speed of sound values for known concentrations of refrigerants. In some embodiments, the speed of sound sensor takes a baseline measurement when no gas leak is present in the air and the controller 104 stores a reference speed of sound measurement for air. The change in the speed of sound measurement may be determined by the difference between the measured speed of sound value through the air and the baseline measurement, or difference between the measured speed of sound value and the reference speed of sound measurement.

In some embodiments, the first leak detection sensor 142 and the second leak detection sensor 144 are thermal conductivity sensors. The thermal conductivity sensors are configured to detect a change in thermal conductivity due to the working fluid leak relative to the thermal conductivity of air. Alternatively, the thermal conductivity sensor may detect the change in the thermal conductivity relative to a reference thermal conductivity of a known reference gas (e.g., nitrogen) in a sealed reference chamber. The thermal conductivity sensor may include an electrically heated filament in a detector body. When air enters the detector body the filament heats up and a resistance is measured. For example, the filament may be arranged in a Wheatstone bridge circuit so that the presence of the air in the detector body produces a measurable resistance. Air containing the working fluid leak will result in a change in the resistance measured. In some embodiments, the thermal conductivity sensor takes a baseline measurement when no gas leak is present in the air and the controller 104 stores a reference thermal conductivity measurement for air. The change in the thermal conductivity may be determined by the difference between the measured thermal conductivity value and the baseline measurement, or the difference between the measured thermal conductivity value and the reference thermal conductivity measurement. The thermal conductivity sensor can measure the change in the resistance, and the controller 104 may compare the measured value to a calibration curve to generate a concentration 174 of the working fluid leak. The calibration curve can be constructed and stored in the controller 104 by measuring thermal conductivity for known concentrations of refrigerants. The calibration curves can be constructed for a range of temperatures and pressures. As will be detailed below, the controller 104 may compare the first concentration 174a or the second concentration 174b to a gas concentration threshold 172 to determine if a working fluid has leaked into the indoor unit 136 and/or the control panel unit 132. In one non-limiting example, the gas concentration threshold 172 is set to 12% of the lower flammability limit (LFL) of the refrigerant.

Figure 5:
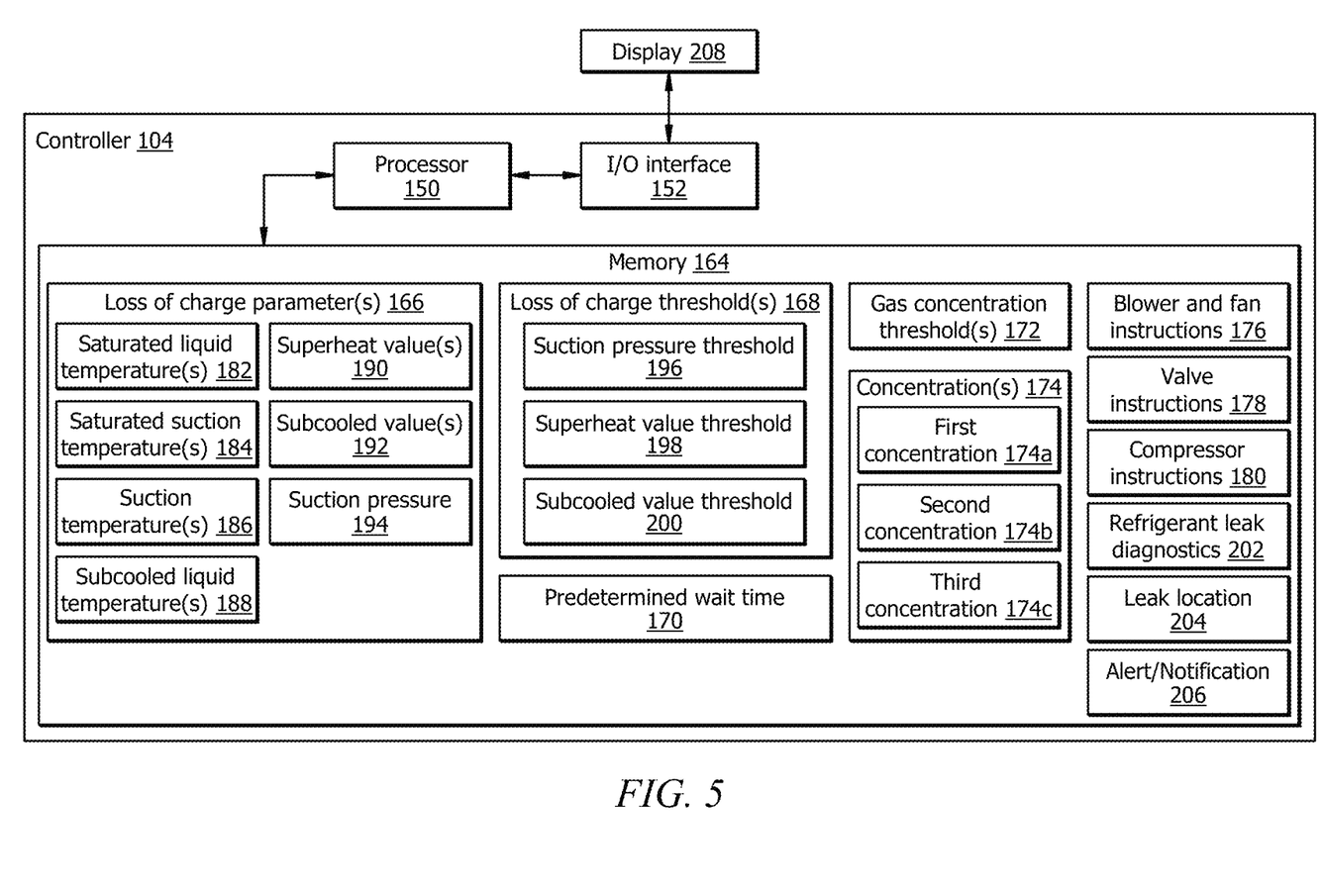
FIG. 5 is a diagram of a controller of the HVAC system of FIG. 1 according to some embodiments of the present disclosure.

Referring to FIG. 5, the controller 104 is communicatively coupled (e.g., via wired and/or wireless connection) to components in the HVAC system 100 and configured to control their operation. In some embodiments, controller 104 can be one or more controllers associated with one or more components of the HVAC system 100. The controller 104 includes a processor 150, memory 164, and an input/output (I/O) interface 152. The controller 104 may communicate with a display 208, which may be configured to display an alert or notification 206 that contains a leak location 204 of the working fluid leak. In some embodiments, the display 208 is on a thermostat that is in communication with the HVAC system 100, or any other suitable display 208 in communication with the controller 104 (e.g., a user's phone, computer, etc.).

The processor 150 comprises one or more processors operably coupled to the memory 164. The processor 150 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs) that communicatively couples to memory 164 and controls the operation of HVAC system 100. The processor 150 may be a programmable logic device, a microcontroller, a microprocessor, or any suitable combination of the preceding. The processor 150 is communicatively coupled to and in signal communication with the memory 164. The one or more processors are configured to process data and may be implemented in hardware or software. For example, the processor 150 may be 8-bit, 16-bit, 32-bit, 64-bit or of any other suitable architecture. The processor 150 may include an arithmetic logic unit (ALU) for performing arithmetic and logic operations, processor registers that supply operands to the ALU and store the results of ALU operations, and a control unit that fetches instructions from memory 164 and executes them by directing the coordinated operations of the ALU, registers, and other components. The processor 150 may include other hardware and software that operates to process information, control the HVAC system 100, and perform any of the functions described herein. The processor 150 is not limited to a single processing device and may encompass multiple processing devices.

The memory 164 includes one or more disks, tape drives, or solid-state drives, and may be used as an over-flow data storage device, to store programs when such programs are selected for execution, and to store instructions and data that are read during program execution. The memory 164 may be volatile or non-volatile and may comprise ROM, RAM, ternary content-addressable memory (TCAM), dynamic random-access memory (DRAM), and static random-access memory (SRAM). The memory 164 is operable to store any suitable set of instructions, logic, rules, and/or code for executing the functions described in this disclosure. For example, the memory 164 may store loss of charge parameters 166 (e.g., saturated liquid temperatures 182, saturated suction temperatures 184, suction temperatures 186, subcooled liquid temperatures 188, superheat values 190, subcooled values 192, and suction pressures 194), loss of charge thresholds 168 (e.g., suction pressure threshold 196, superheat value threshold 198, subcooled value threshold 200), predetermined wait time 170, gas concentration thresholds 172, concentration 174 (e.g., a first concentration 174a, a second concentration 174b), blower and fan instructions 176, valve instructions 178, compressor instructions 180, refrigerant leak diagnostics 202, leak location 204, and alert/notification 206 instructions.

The I/O interface 152 is configured to communicate data and signals with other devices. For example, the I/O interface 152 may be configured to communicate electrical signals with the other components of the HVAC system 100.

The I/O interface 152 may comprise ports and/or terminals for establishing signal communications between the controller 104 and other devices. The I/O interface 152 may be configured to enable wired and/or wireless communications. Connections between various components of the HVAC system 100 and between components of HVAC system 100 may be wired or wireless. For example, conventional cable and contacts may be used to couple the various components of the HVAC system 100, including, the compressor 106, the expansion valve 114, the blower 128, the one or more loss of charge sensors 140a-140e, the first leak detection sensor 142, the second leak detection sensor 144, and the display 208. In some embodiments, a data bus couples various components of the HVAC system 100 together such that data is communicated there between. In a typical embodiment, the data bus may include, for example, any combination of hardware, software embedded in a computer readable medium, or encoded logic incorporated in hardware or otherwise stored (e.g., firmware) to couple components of HVAC system 100 to each other.

As an example and not by way of limitation, the data bus may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus may include any number, type, or configuration of data buses, where appropriate. In certain embodiments, one or more data buses (which may each include an address bus and a data bus) may couple the controller 104 to other components of the HVAC system 100.

Method of Operation

Figure 6:
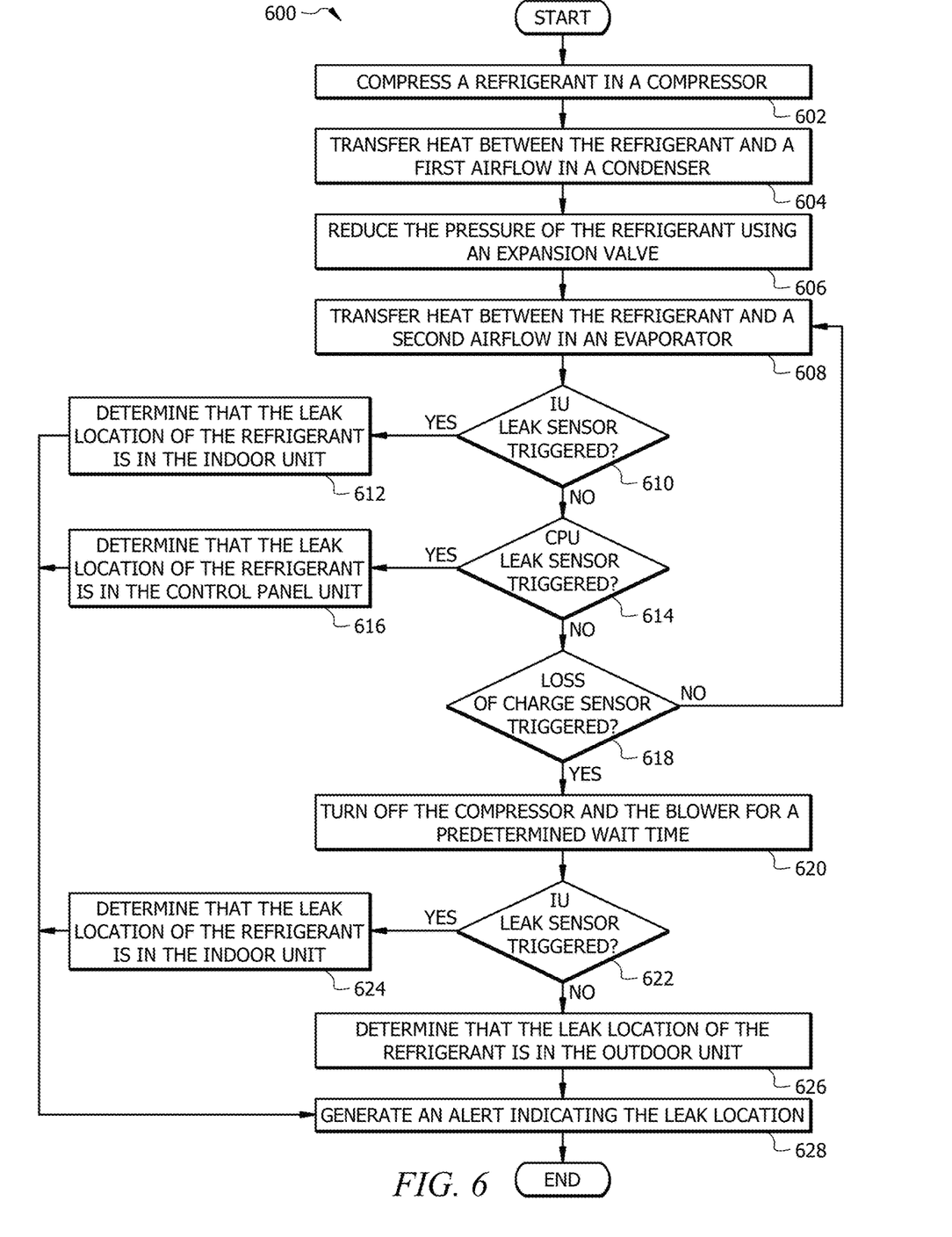
FIG. 6 is a flowchart of an example method of operating the system of FIG. 1.

FIG. 6 illustrates an example operational flow 600 of operating the HVAC system 100 of FIGS. 1-5. The operational flow 600 can be logically described in three parts. The first part includes operations 602-608, which generally includes compressing a refrigerant in a compressor 106, transferring heat between the refrigerant and an airflow 112 in a condenser 108, reducing the pressure of the refrigerant in an expansion valve 114, transferring heat between the refrigerant and an airflow 118 in an evaporator 116. The second part includes operations 610-616, which generally include determining whether a first leak detection sensor 142 in the indoor unit 136 is triggered, and determining if the second leak detection sensor 144 in the control panel unit 132 is triggered. If the first leak detection sensor 142 is triggered, the second part includes determining that the leak location 204 of the refrigerant is in the indoor unit 136, and if the second leak detection sensor 144 is triggered, the second part includes determining that the leak location 204 of the refrigerant is in the control panel unit 132. If neither of the first leak detection sensor 142 nor the second leak detection sensor 144 are triggered, then the operational flow 600 proceeds to the third part. The third part generally includes operations 618-630, which generally includes determining whether a loss of charge sensor 140a-140e is triggered. If one of the loss of charge sensors 140a-140e is triggered, the third part includes turning off the compressor 106 and the blower 128 for a predetermined wait time 170, determining whether the first leak detection sensor 142 of the indoor unit 136 is triggered after the predetermined wait time 170. If the first leak detection sensor 142 of the indoor unit 136 is triggered after the predetermined wait time 170, the third part includes determining that the leak location 204 of the refrigerant is in the indoor unit 136. If the first leak detection sensor 142 of the indoor unit 136 is not triggered after the predetermined wait time 170, the third part includes determining that the leak location 204 of the refrigerant is in the outdoor unit 134. The third part may further include generating an alert or notification 206 indicating the leak location 204, and optionally displaying the alert or notification 206 on the display 208.

At operation 602, the operational flow 600 includes compressing the refrigerant using the compressor 106 in the control panel unit 132 of the HVAC system 100. For example, the compressor 106 may receive refrigerant from the evaporator 116 via the suction line 210. The compressor 106 may compress the refrigerant and transport the refrigerant to the condenser 108 via the discharge line 212. At operation 604, the operational flow 600 includes transferring heat between the airflow 112 flowing across the condenser 108 and the refrigerant flowing through the condenser 108 in the outdoor unit 134. The compressed, cooled refrigerant flows from the condenser 108 in the outdoor unit 134 to the expansion valve 114 in the indoor unit 136 via the liquid line 214.

At operation 606, the operational flow 600 includes reducing the pressure of the refrigerant using the expansion valve 114 in the indoor unit 136. The expansion valve 114 may be in communication with the controller 104 (e.g., via wired and/or wireless communication) to receive control signals for opening and/or closing associated valves and/or to provide flow measurement signals corresponding to the rate of the refrigerant flowing through the liquid line 214. At operation 608, the operational flow 600 includes transferring heat between airflow 118 flowing across the evaporator 116 and refrigerant flowing through the evaporator 116 in the indoor unit 136 to produce a conditioned airflow 120 that is delivered to a target space.

At decision block 610, the operational flow 600 includes determining if the first leak detection sensor 142 is triggered within the indoor unit 136. Decision block 610 may include receiving a measurement that is indicative of a first concentration 174a of refrigerant that has leaked into the indoor unit 136 using the first leak detection sensor 142. As described in detail above, the first leak detection sensor 142 may be a thermal conductivity sensor or a speed of sound sensor. The controller 104 may receive the change in thermal conductivity and/or speed of sound of the air in the indoor unit 136 to determine a first concentration 174a of refrigerant in the indoor unit 136. Decision block 610 may further include using the controller 104 to compare the first concentration 174a of the refrigerant in the indoor unit 136 to a gas concentration threshold 172. In some embodiments, the gas concentration threshold 172 is 12% of a lower flammability limit (LFL) of the refrigerant in the indoor unit 136. If the first concentration 174a of the refrigerant in the indoor unit 136 exceeds the gas concentration threshold 172, then the operational flow 600 may proceed to operation 612. At operation 612, the operational flow 600 includes determining that the leak location 204 of the refrigerant is in the indoor unit 136. If the first concentration 174a of the refrigerant in the indoor unit 136 is less than the gas concentration threshold 172, then the operational flow 600 proceeds to decision block 614.

At decision block 614, the operational flow 600 includes determining if the second leak detection sensor 144 is triggered within the control panel unit 132. Decision block 614 may include receiving a measurement that is indicative of a second concentration 174b of refrigerant that has leaked into the control panel unit 132 using the second leak detection sensor 144. As described in detail above, the second leak detection sensor 144 may be a thermal conductivity sensor or a speed of sound sensor. The controller 104 may receive the change in thermal conductivity and/or speed of sound of the air in the control panel unit 132 to determine a second concentration 174b of refrigerant in the control panel unit 132. Decision block 614 may further include using the controller 104 to compare the second concentration 174b of the refrigerant in the control panel unit 132 to the gas concentration threshold 172. If the second concentration 174b of the refrigerant in the control panel unit 132 exceeds the gas concentration threshold 172, then the operational flow 600 may proceed to operation 616. At operation 616, the operational flow 600 includes determining that the leak location 204 of the refrigerant is in the control panel unit 132. If the second concentration 174b of the refrigerant in the control panel unit 132 is less than the gas concentration threshold 172, then the operational flow 600 proceeds to operation 618.

At operation 618, the operational flow 600 includes determining if the one or more loss of charge sensors 140a-140e are triggered. Operation 618 may include having the controller 104 receive at least a first loss of charge parameter 166 from the one or more loss of charge sensors 140a-140e. For example, the suction pressure sensor 140a may be configured to measure a suction pressure 194 of the compressor 106, the first condenser sensor 140b may be configured to measure a saturated liquid temperature 182 of the refrigerant in the condenser 108, the second condenser sensor 140c may be configured to measure a subcooled liquid temperature 188 of the refrigerant in and/or exiting the condenser 108, the first evaporator sensor 140d may be configured to measure a saturated suction temperature 184 of the refrigerant flowing in the evaporator 116, and the second evaporator sensor 140e may be configured to measure a suction temperature of the refrigerant in and/or exiting the evaporator 116. Operation 618 may further include determining that refrigerant leak diagnostics 202 should be performed for the HVAC system based on a comparison of the first loss of charge parameter 166 to a loss of charge threshold 168.

As detailed above, in one embodiment, the loss of charge threshold 168 may include a suction pressure threshold 196. For example, operation 618 may include comparing the suction pressure 194 measured by the suction pressure sensor 140a to the suction pressure threshold 196. If the suction pressure 194 is less than or equal to the suction pressure threshold 196 (e.g., suction pressure is less than or equal to 100 psig), then the controller 104 may determine that a loss of charge is present in the HVAC system 100 and may proceed to perform refrigerant leak diagnostics 202 to identify a leak location 204.

Additionally or alternatively, the loss of charge threshold 168 may include a subcooled value threshold 200. For example, operation 618 may include comparing a subcooled value 192 to a subcooled value threshold 200. The controller 104 may determine the subcooled value 192 based on a difference between the subcooled liquid temperature 188 measured by the second condenser sensor 140c and the saturated liquid temperature 182 measured by the first condenser sensor 140b. If the subcooled value 192 is less than or equal to the subcooled value threshold 200 (e.g., subcooled value is less than or equal to 4° F.), then the controller 104 may determine that a loss of charge is present in the HVAC system 100 and may proceed to perform refrigerant leak diagnostics 202 to identify the leak location 204.

Additionally or alternatively, the loss of charge threshold 168 may include a superheat value threshold 198. For example, operation 618 may include comparing a superheat value 190 to a superheat value threshold 198. The controller 104 may determine the superheat value 190 based on a difference between the suction temperature 186 measured by the second evaporator sensor 140e and the saturated suction temperature 184 measured by the first evaporator sensor 140d. If the superheat value 190 is greater than or equal to the superheat value threshold 198 (e.g., superheat value is greater than or equal to 25° F.), then the controller 104 may determine that a loss of charge is present in the HVAC system 100 and may proceed to perform refrigerant leak diagnostics 202 to identify the leak location 204. If one of the loss of charge thresholds 168 is met, the operational flow 600 proceeds to operation 620. If the one or more loss of charge thresholds 168 are not met, the operational flow 600 may return to operation 608.

At operation 620, the operational flow 600 includes turning off the compressor 106 and the blower 128 for a predetermined wait time 170. In some embodiments, the first concentration 174a of the refrigerant measured in the indoor unit 136 at decision block 610 may not be accurate during the operation of the HVAC system 100. This may be due to the fact that the blower 128 moves a substantial amount of airflow 118 through the indoor unit 136, which may dilute the first concentration 174a of refrigerant that leaks into the indoor unit 136. Conversely, the second concentration 174b of the refrigerant measured in the control panel unit 132 may be more accurate during operation of the HVAC system 100 compared to the indoor unit 136 measurement because the control panel unit 132 experiences less airflow through the control panel unit 132 (e.g., which may be due at least in part to the first partition 146 and the second partition 148). Turning off the HVAC system 100 by turning the blower 128 and the compressor 106 off allows for any refrigerant leak to accumulate to allow the first leak detection sensor 142 to acquire a more accurate reading. In some embodiments, the predetermined wait time 170 may be from at least one minute to at least five minutes. However, any suitable predetermined wait time 170 may be utilized.

At decision block 624, the operational flow 600 includes determining if the first leak detection sensor 142 is triggered within the indoor unit 136 after the predetermined wait time 170. Decision block 624 may include receiving a measurement that is indicative of a third concentration 174c of refrigerant that has leaked into the indoor unit 136 using the first leak detection sensor 142 after the predetermined wait time 170 has elapsed. The controller 104 may receive a change in thermal conductivity and/or a speed of sound of the air in the indoor unit 136 to determine the third concentration 174c of the refrigerant in the indoor unit 136. Decision block 624 may further include using the controller 104 to compare the third concentration 174c of the refrigerant in the indoor unit 136 to the gas concentration threshold 172. If the third concentration 174c of the refrigerant in the indoor unit 136 exceeds the gas concentration threshold 172, then the operational flow 600 may proceed to operation 626. At operation 626, the operational flow 600 includes determining that the leak location 204 of the refrigerant is in the indoor unit 136. If the third concentration 174c of the refrigerant in the indoor unit 136 is less than the gas concentration threshold 172, then operational flow 600 proceeds to operation 628.

At operation 628, the operational flow 600 includes determining that the leak location 204 of the refrigerant is in the outdoor unit 134. In some embodiments, the controller 104 may determine that the leak location 204 is in the outdoor unit 134 at least because decision block 624 and/or decision block 610 determined that the leak location 204 is not in the indoor unit 136, and decision block 614 determined that the leak location 204 is not in the control panel unit 132. The operational flow 600 may proceed to operation 630, which includes generating an alert or notification 206 that indicates the leak location 204. Operation 603 may include displaying the alert or notification 206 on the display 208

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A heating, ventilation, and air conditioning (HVAC) system, comprising:
   an outdoor unit comprising a condenser configured to receive refrigerant;
   an indoor unit comprising:
      an expansion valve configured to receive the refrigerant from the condenser;
      an evaporator configured to receive the refrigerant from the expansion valve;
      a blower configured to move airflow across the evaporator;
      a first leak detection sensor;
   at least one loss of charge sensor configured to measure at least one loss of charge parameter of the refrigerant flowing through the HVAC system;
   a control panel unit comprising:
      a compressor configured to receive the refrigerant from the evaporator;
      a second leak detection sensor;
      a controller comprising a memory and a processor, the memory operable to store at least a first loss of charge threshold, a predetermined wait time, and a gas concentration threshold, the processor operatively coupled to the memory and configured to:
         receive, from the at least one loss of charge sensor, at least a first loss of charge parameter;
         determine that refrigerant leak diagnostics should be performed for the HVAC system based on a comparison of at least the first loss of charge parameter to the at least one loss of charge threshold;
         turn the compressor and the blower off for the predetermined wait time in response to the comparison of the first loss of charge parameter to the at least one loss of charge threshold;
         receive, from the first leak detection sensor after the first predetermined wait time, a measurement that is indicative of a concentration of the refrigerant in the indoor unit;
         receive, from the second leak detection sensor, a measurement that is indicative of a concentration of the refrigerant in the control panel unit; and
         determine a leak location of the refrigerant, wherein (i) if the concentration of the refrigerant in the indoor unit and the control panel unit is less than the gas concentration threshold, the processor is configured to determine that the leak location of the refrigerant is in the outdoor unit of the HVAC system, (ii) if the concentration of the refrigerant in the indoor unit is greater than the gas concentration threshold, the processor is configured to determine that the leak location is in the indoor unit of the HVAC system, and (iii) if the concentration of the refrigerant in the control panel unit is greater than the gas concentration threshold, the processor is configured to determine that the leak location is in the control panel unit of the HVAC system.

2. The HVAC system of claim 1, wherein the processor is further configured to:
   generate an alert indicating the leak location; and
   display the alert on a display.

3. The HVAC system of claim 1 further comprising:
   a first partition that separates the first leak detection sensor in the indoor unit from the second leak detection sensor in the control panel unit; and
   a second partition that separates the control panel unit from the outdoor unit.

4. The HVAC system of claim 1, wherein the at least one loss of charge sensor comprises a suction pressure sensor operable to measure a suction pressure of the compressor;
   wherein receiving at least the first loss of charge parameter in the processor comprises receiving, from the suction pressure sensor, a first suction pressure of the refrigerant; and
   wherein determining that leak diagnostics should be performed comprises determining that the suction pressure is less than or equal to a suction pressure threshold.

5. The HVAC system of claim 1, wherein the at least one loss of charge sensor comprises:
   a first evaporator sensor operable to measure a saturated suction temperature of the refrigerant flowing through the evaporator;
   a second evaporator sensor operable to measure a suction temperature of the refrigerant;
   wherein receiving at least the first loss of charge parameter in the processor comprises:
      receiving, from the first evaporator sensor, the saturated suction temperature of the refrigerant;
      receiving, from the second evaporator sensor, the suction temperature of the refrigerant; and
   wherein determining that leak diagnostics should be performed comprises:
      determining a superheat value based on a difference between the suction temperature and the saturated suction temperature; and
      determining that the superheat value is greater than or equal to a superheat value threshold.

6. The HVAC system of claim 1, wherein the at least one loss of charge sensor comprises:

a first condenser sensor operable to measure a saturated liquid temperature of the refrigerant flowing through the condenser;

a second condenser sensor operable to measure a subcooled liquid temperature of the refrigerant;

wherein receiving at least the first loss of charge parameter in the processor comprises:

receiving, from the first condenser sensor, the saturated liquid temperature of the refrigerant;

receiving, from the second condenser sensor, the subcooled liquid temperature of the refrigerant; and wherein determining that leak diagnostics should be performed comprises:

determining a subcooled value based on a difference between the subcooled liquid temperature and the saturated liquid temperature; and determining that the subcooled value is less than or equal to a subcooled value threshold.

7. The HVAC system of claim 1 further comprising:

a suction line that places the evaporator in fluid communication with the compressor, wherein the indoor unit comprises a first portion of the suction line and the control panel unit comprises a second portion of the suction line;

a discharge line that places the compressor in fluid communication with the condenser, wherein the control panel unit comprises a first portion of the discharge line and the outdoor unit comprises a second portion of the discharge line; and a liquid line that places the condenser in fluid communication with the evaporator, wherein the outdoor unit comprises a first portion of the liquid line, the control panel unit comprises a second portion of the liquid line, and the indoor unit comprises a third portion of the liquid line.

8. A method of operating a heating, ventilation, and air conditioning (HVAC) system, the method comprising:

receiving at least a first loss of charge parameter of refrigerant flowing through the HVAC system from at least one loss of charge sensor;

determining that refrigerant leak diagnostics should be performed for the HVAC system based on a comparison of at least the first loss of charge parameter to at least one loss of charge threshold;

turning a compressor off in a control panel unit and a blower off in an indoor unit for a predetermined wait time in response to the comparison of the first loss of charge parameter to the at least one loss of charge threshold;

receiving a measurement after the predetermined wait time that is indicative of a concentration of the refrigerant in the indoor unit from a first leak detection sensor;

receiving a measurement that is indicative of a concentration of the refrigerant in the control panel unit from a second leak detection sensor; and determining a leak location of the refrigerant using a controller, wherein (i) if the concentration of the refrigerant in the indoor unit and the control panel unit is less than a gas concentration threshold, the controller is configured to determine that the leak location of the refrigerant is in an outdoor unit of the HVAC system that comprises a condenser, (ii) if the concentration of the refrigerant in the indoor unit is greater than the gas concentration threshold, the controller is configured to determine that the leak location is in the indoor unit of the HVAC system, and (iii) if the concentration of the refrigerant in the control panel unit is greater than the gas concentration threshold, the controller is configured to determine that the leak location is in the control panel unit of the HVAC system.

9. The method of claim 8 further comprising:
generating an alert indicating the leak location; and
displaying the alert on a display.

10. The method of claim 8, wherein the HVAC system further comprises a first partition that separates the first leak detection sensor in the indoor unit from the second leak detection sensor in the control panel unit, and a second partition that separates the control panel unit from the outdoor unit.

11. The method of claim 8, wherein the at least one loss of charge sensor comprises a suction pressure sensor operable to measure a suction pressure of the compressor;

wherein receiving at least the first loss of charge parameter in the controller comprises receiving, from the suction pressure sensor, a first suction pressure of the refrigerant; and wherein determining that leak diagnostics should be performed comprises determining that the suction pressure is less than or equal to a suction pressure threshold.

12. The method of claim 8, wherein the at least one loss of charge sensor comprises:

a first evaporator sensor operable to measure a saturated suction temperature of the refrigerant flowing through the evaporator;

a second evaporator sensor operable to measure a suction temperature of the refrigerant;

wherein receiving at least the first loss of charge parameter in the controller comprises:

receiving, from the first evaporator sensor, the saturated suction temperature of the refrigerant;

receiving, from the second evaporator sensor, the suction temperature of the refrigerant; and wherein determining that leak diagnostics should be performed comprises:

determining a superheat value based on a difference between the suction temperature and the saturated suction temperature; and determining that the superheat value is greater than or equal to a superheat value threshold.

13. The method of claim 8, wherein the at least one loss of charge sensor comprises:

a first condenser sensor operable to measure a saturated liquid temperature of the refrigerant flowing through the condenser;

a second condenser sensor operable to measure a subcooled liquid temperature of the refrigerant exiting the condenser;

wherein receiving at least the first loss of charge parameter in the controller comprises:

receiving, from the first condenser sensor, the saturated liquid temperature of the refrigerant;

receiving, from the second condenser sensor, the subcooled liquid temperature of the refrigerant; and wherein determining that leak diagnostics should be performed comprises:

determining a subcooled value based on a difference between the subcooled liquid temperature and the saturated liquid temperature; and determining that the subcooled value is less than or equal to a subcooled value threshold.

14. The method of claim 9, wherein:
a suction line that places an evaporator in fluid communication with the compressor, and wherein the indoor unit comprises a first portion of the suction line and the control panel unit comprises a second portion of the suction line;

a discharge line that places the compressor in fluid communication with the condenser, wherein the control panel unit comprises a first portion of the discharge line and the outdoor unit comprises a second portion of the discharge line; and a liquid line that places the condenser in fluid communication with the evaporator, wherein the outdoor unit comprises a first portion of the liquid line, the control panel unit comprises a second portion of the liquid line, and the indoor unit comprises a third portion of the liquid line.

15. The method of claim 9, wherein the refrigerant is an A2L refrigerant.

16. A controller of a heating, ventilation, and air conditioning (HVAC) system, the controller comprising:

a memory operable to store at least a first loss of charge threshold, a predetermined wait time, and a gas concentration threshold;

a processor operatively coupled to the memory and configured to:

receive at least a first loss of charge parameter of refrigerant flowing through the HVAC system from at least one loss of charge sensor;

determine that refrigerant leak diagnostics should be performed for the HVAC system based on a comparison of at least the first loss of charge parameter to the at least one loss of charge threshold;

turn a compressor in a control panel unit and a blower in an indoor unit of the HVAC system off for the predetermined wait time in response to the comparison of the first loss of charge parameter to the at least one loss of charge threshold;

receive a measurement after the predetermined wait time that is indicative of a concentration of the refrigerant in the indoor unit from a first leak detection sensor;

receive a measurement that is indicative of a concentration of the refrigerant in the control panel unit from a second leak detection sensor; and determine a leak location of the refrigerant, wherein (i) if the concentration of the refrigerant in the indoor unit and the control panel unit is less than the gas concentration threshold, the processor is configured to determine that the leak location of the refrigerant is in an outdoor unit of the HVAC system, (ii) if the concentration of the refrigerant in the indoor unit is greater than the gas concentration threshold, the processor is configured to determine that the leak location is in the indoor unit of the HVAC system, and (iii) if the concentration of the refrigerant in the control panel unit is greater than the gas concentration threshold, the processor is configured to determine that the leak location is in the control panel unit of the HVAC system.

17. The controller of claim 16, wherein the processor is further configured to:

generate an alert indicating the leak location; and
display the alert on a display.

18. The controller of claim 16, wherein the at least one loss of charge sensor comprises a suction pressure sensor operable to measure a suction pressure of the compressor;

wherein receiving at least the first loss of charge parameter in the processor comprises receiving, from the suction pressure sensor, a first suction pressure of the refrigerant; and wherein determining that leak diagnostics should be performed comprises determining that the suction pressure is less than or equal to a suction pressure threshold.

19. The controller of claim 16, wherein the at least one loss of charge sensor comprises:

a first evaporator sensor operable to measure a saturated suction temperature of the refrigerant flowing through the evaporator;

a second evaporator sensor operable to measure a suction temperature of the refrigerant;

wherein receiving at least the first loss of charge parameter in the processor comprises:

receiving, from the first evaporator sensor, the saturated suction temperature of the refrigerant;

receiving, from the second evaporator sensor, the suction temperature of the refrigerant; and wherein determining that leak diagnostics should be performed comprises:

determining a superheat value based on a difference between the suction temperature and the saturated suction temperature; and determining that the superheat value is greater than or equal to a superheat value threshold.

20. The controller of claim 16, wherein the at least one loss of charge sensor comprises:

a first condenser sensor operable to measure a saturated liquid temperature of the refrigerant flowing through the condenser;

a second condenser sensor operable to measure a subcooled liquid temperature of the refrigerant exiting the condenser;

wherein receiving at least the first loss of charge parameter in the processor comprises:

receiving, from the first condenser sensor, the saturated liquid temperature of the refrigerant;

receiving, from the second condenser sensor, the subcooled liquid temperature of the refrigerant; and wherein determining that leak diagnostics should be performed comprises:

determining a sub-cooled value based on a difference between the subcooled liquid temperature and the saturated liquid temperature; and determining that the subcooled value is less than or equal to a subcooled value threshold.

\* \* \* \* \*